No. 731,931. PATENTED JUNE 23, 1903.
L. B. MILLHAUSEN.
BOLT PROTECTOR.
APPLICATION FILED NOV. 1, 1902.
NO MODEL.

Inventor
Louis B. Millhausen.

Witnesses
F. W. Riley.
Chas. S. Hyer.

By Victor J. Evans
Attorney

THE NORRIS PETERS CO., PHOTO-LITHO., WASHINGTON, D. C.

No. 731,931.

Patented June 23, 1903.

UNITED STATES PATENT OFFICE.

LOUIS B. MILLHAUSEN, OF MORRISVILLE, PENNSYLVANIA.

BOLT-PROTECTOR.

SPECIFICATION forming part of Letters Patent No. 731,931, dated June 23, 1903.

Application filed November 1, 1902. Serial No. 129,747. (No model.)

*To all whom it may concern:*

Be it known that I, LOUIS B. MILLHAUSEN, a citizen of the United States, residing at Morrisville, in the county of Bucks and State of Pennsylvania, have invented new and useful Improvements in Bolt-Protectors, of which the following is a specification.

This invention relates to a bolt-protector adapted for use in bridge-building, iron-work generally, and in such devices where a bolt is liable to become jammed and injured.

It frequently occurs that threaded bolts become jammed or stick in the openings or holes therefor in different kinds of iron-work or other devices in which they are used, and it is necessary to drive them out by the use of punches or other implements in order to disconnect the parts engaged by said bolts. This driving operation to release the bolts injures the threads, and the latter have to be recut at considerable expense in addition to the disadvantage of the delay incident to the removal of the bolts. The threads of the bolts not only become injured by this forceful operation of detaching the same, but likewise the threads of the bolt-holes are simultaneously impaired and have to be recut. The present improvement is intended to overcome these disadvantages and render the application and disconnection of a bolt expeditious and also dispense with the necessity of threading bolt-holes without in the least detracting from the securing function of bolts.

The invention consists in the construction and arrangement of the several parts, which will be more fully hereinafter described and claimed.

Figure 1:
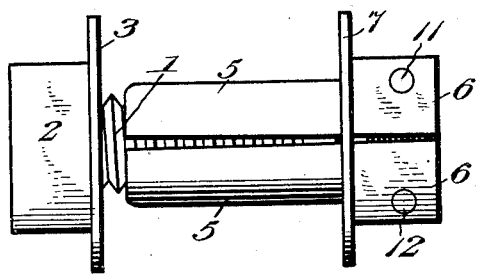
Figure 2:
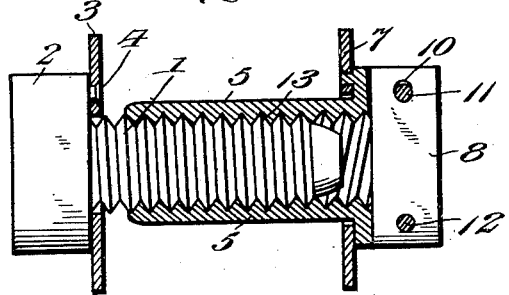
Figure 4:
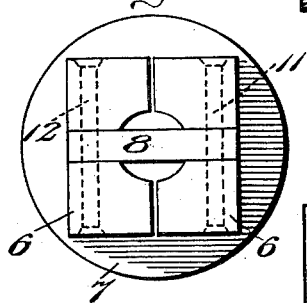
Figure 3:
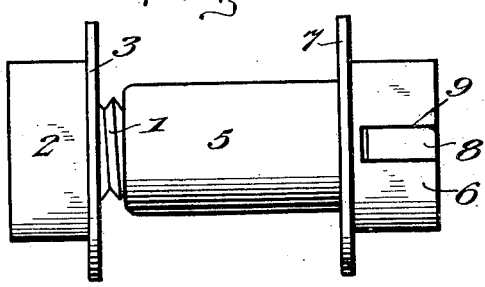

In the drawings, Figure 1 is a side elevation of a bolt and protector embodying the features of the invention. Fig. 2 is a longitudinal vertical section through the protector and washers used in connection with the latter and the bolt. Fig. 3 is a side elevation of the improved protector and bolt in a different position from that shown by Fig. 1. Fig. 4 is an end elevation of the protector.

Similar numerals of reference are employed to indicate corresponding parts in the several views.

The numeral 1 designates the usual form of threaded bolt, having a head 2, to which a washer 3 is held by a rivet 4. The purpose of holding the washer 3 in connection with the head of the bolt is to always have the same in place when the bolt is applied and also to prevent loss of the same after the bolt has been detached from a securing position. The protector comprises semicylindrical sections 5, each of which has a terminal enlargement 6, and to one of the said enlargements a washer 7 is riveted to hold it in place. The opening through the washer 7 is large enough to permit one of the sections 5 to move in relation to the other similar section, and extending across from one terminal enlargement 6 to the other is a connecting-key 8. This key 8 is in the form of a flat metal strip, which is disposed in slots 9, formed in the enlargements 6 and immovably secured to one of the latter and having an enlarged or slightly-elongated opening 10 in the extremity thereof opposite that immovably secured in relation to one of the enlargements. The key 8 is held in place in the enlargements 6 by pins 11 and 12, the pin 11 passing through the elongated opening 10, and thereby permitting the section 5, through whose enlargement 6 the pin 11 passes, to have a free movement toward and away from the remaining section. The interior of the sections are formed with threads 13 to engage the threads of the bolt 1; but the outer surfaces of both sections are perfectly smooth.

In applying the bolt and protector set forth the sections 5 are unitedly pushed through the bolt-opening and held against rotation by a wrench or other suitable implement, which is caused to engage the enlargement 6, the latter conjointly providing a head or member simulating a nut. The bolt 1, with its washer 3, is then inserted in the opposite side of the bolt-opening into the sections 5 and rotated to cause the threads thereof to turn into the threads 13 of the said sections. This will cause the one section to expand or move apart from the other section, and thereby tightly jam both sections within the bolt-opening and prevent the protector and bolt from becoming separated from the device in which they are mounted. In removing the bolt it will be seen that the threads thereof will be protected by engaging the sections 5, and, furthermore, in this operation the detachment of the bolt may be expeditiously carried on in view of the absence of obstruction to the ready withdrawal thereof. After the bolt is disconnected from the sections 5 or the protector the latter may be withdrawn from the bolt-hole, and in reassembling the bolt and protector in connection with a device or devices to be secured thereby it will be unnecessary to recut the threads of the bolt or otherwise reprepare the same for practical service. To accommodate the expansion of the sections 5, the bolt-hole in the device or devices through which it is desired to insert the bolt and protector will be enlarged sufficiently to permit the bolt and its protector to be practically applied. As the bolt is turned into the sections of the protector the latter gradually expands or the one section moves outwardly in relation to the other, and hence the bolt becomes reliably jammed in securing position without affecting the threads thereof.

The improved device will be found exceptionally useful and advantageous, and changes in the proportions, dimensions, and minor details may be resorted to without departing from the spirit of the invention.

Having thus fully described the invention, what is claimed as new is—

1. The combination with a bolt, of a protector comprising interiorly-screw-threaded cylindrical sections having terminal enlargements, and a connecting device rigidly secured to one enlargement and movably attached to the other whereby one section may be moved in relation to the other and expansible by engagement with the bolt.

2. The combination with a bolt, of a protector comprising interiorly-threaded cylindrical sections having terminal enlargements with slots therein, and a key fitted in said slots, one enlargement being fixed to the one end of the key and the other enlargement movably attached to the opposite end of said key.

3. The combination with a bolt having a head, of a washer secured to said head, and an internally-screw-threaded protector comprising semicylindrical sections pivotally connected at one end and adapted to receive said bolt and having a washer mounted thereover and secured thereto.

In testimony whereof I affix my signature in presence of two witnesses.

LOUIS B. MILLHAUSEN.

Witnesses:
WM. G. HOWELL,
EDWARD T. RODMAN.